United States Patent [19]
Catapano

[11] Patent Number: 4,733,996
[45] Date of Patent: Mar. 29, 1988

[54] DRILL GUIDE FIXTURE, FOR DIRECTING DRILLS ORTHOGONALLY INTO TUBES IN TUBESHEETS

[76] Inventor: Michael C. Catapano, 49 Bayberry La., Middletown, N.J. 07748

[21] Appl. No.: 940,742

[22] Filed: Dec. 11, 1986

[51] Int. Cl.⁴ ............................................ B23B 49/02
[52] U.S. Cl. .................................... 408/79; 408/72 B; 408/115 R
[58] Field of Search ..................... 408/72 R, 72 B, 79, 408/115 R, 115 B

[56] References Cited

U.S. PATENT DOCUMENTS

| | | | |
|---|---|---|---|
| 1,160,267 | 11/1915 | Davis | 408/72 R |
| 2,466,023 | 4/1949 | Griffin | 408/79 |
| 2,634,632 | 4/1953 | Johnson | 408/115 R X |
| 3,244,034 | 4/1966 | Severdia | 408/72 B |

FOREIGN PATENT DOCUMENTS 819859  9/1959  United Kingdom ............. 408/72 R

*Primary Examiner*—Gil Weidenfeld
*Assistant Examiner*—Steven C. Bishop
*Attorney, Agent, or Firm*—Bernard J. Murphy

[57] ABSTRACT

The fixture, in a first embodiment of the invention, comprises a flat base having a plurality of mounting holes formed therein, and a platform supported above the base, by a plurality of legs integral with both the base and platform. The base and platform are in parallel planes, and the platform has a guide bushing slidably engaged with an aperture formed in the platform. A lock screw, threaded into a tapped hole formed in the platform adjustably secures the bush in place. Plugs engageable with tubes in the tubesheet are passed into the mounting holes in the base to fix the base securely to the tubesheet, and the bushing receives therein a drill for drilling out a tube, in the tubesheet, which is directly aligned with the bushing. The bushing has an arcuate cut-out formed therein to accommodate the withdrawal of the bushing from the platform, without having to release the plugs, and its replacement by another bushing to facilitate reaming of the tubesheet. The cut-out permits the bushing to be extracted right past the lock screw.

15 Claims, 4 Drawing Figures

DRILL GUIDE FIXTURE, FOR DIRECTING DRILLS ORTHOGONALLY INTO TUBES IN TUBESHEETS

This invention pertains to accessories and tools used in connection with the maintenance and repair of tubes in tubesheets in heat exchangers, steam condensers, and the like, and in particular to a novel drill guide fixture, for directing drills orthogonally into tubes in tubesheets, which accommodates field maintenance and repair in that the fixture can be locked or fastened to the tubesheet vertically, or horizontally above or below a given reference.

There are drill guide fixtures in the prior art, and typical thereof, perhaps, is the Drill Jig disclosed in U.S. Pat. No. 2,996,936, issued on Aug. 22, 1961, to Herman T. Blaise. The patentee's Drill Jig, however, has no means to fasten the same to a tubesheet. It is concerned with a true leveling of its base with respect to a surface of a blank which is to be drilled. Consequently, it has three adjustable support legs, and a spirit level, for correcting for level; one threadedly turns the legs into or out of the base to raise or lower the lobes of the base in which the legs are threadedly engaged, until the bubble in the spirit level is bisected by cross-hairs provided for the purpose. The patentee has no teaching of how to employ his Jig for the drilling of tubes in a tubesheet in which, for instance, the tubesheet is vertically disposed, or is an overhead structure.

It is an object of this invention, therefore, to set forth a novel drill guide fixture, for directing drills orthogonally into tubes in tubesheets, with the tubesheet being vertically set or overhead.

It is particularly an object of this invention to set forth a drill guide fixture, for directing drills orthogonally into tubes in tubesheets, comprising first means defining a base; and second means defining a platform; wherein said base and said platform lie in parallel planes; said base has a plurality of mounting holes formed therein, and said platform has an aperture formed therethrough, parallel with said mounting holes, in which to accommodate a guide bushing.

Further objects of this invention, as well as the novel features thereof, will become more apparent by reference to the following description taken in conjunction with the accompanying figures, in which.

Figure 1:
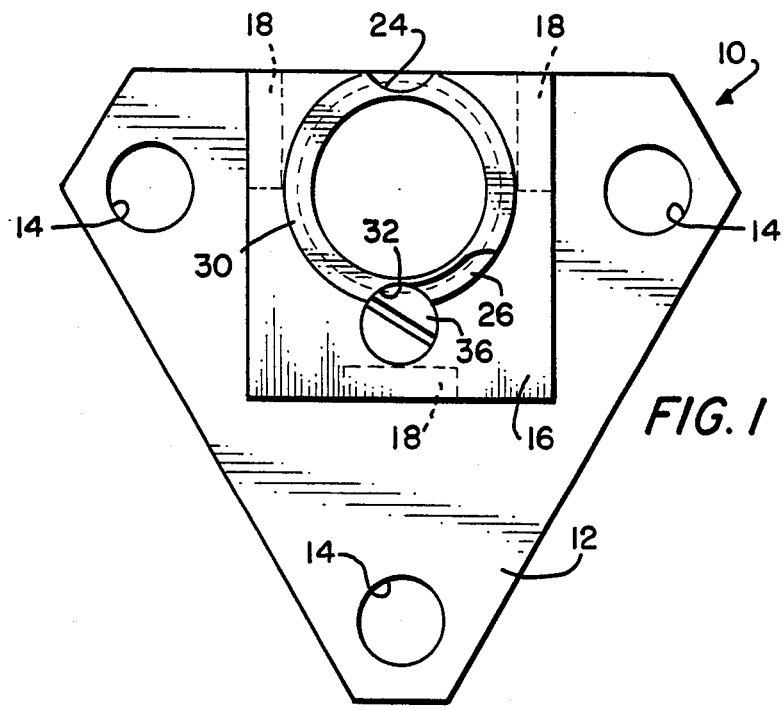
FIG. 1 is a plan view of a first embodiment of the novel drill guide fixture.
Figure 2:
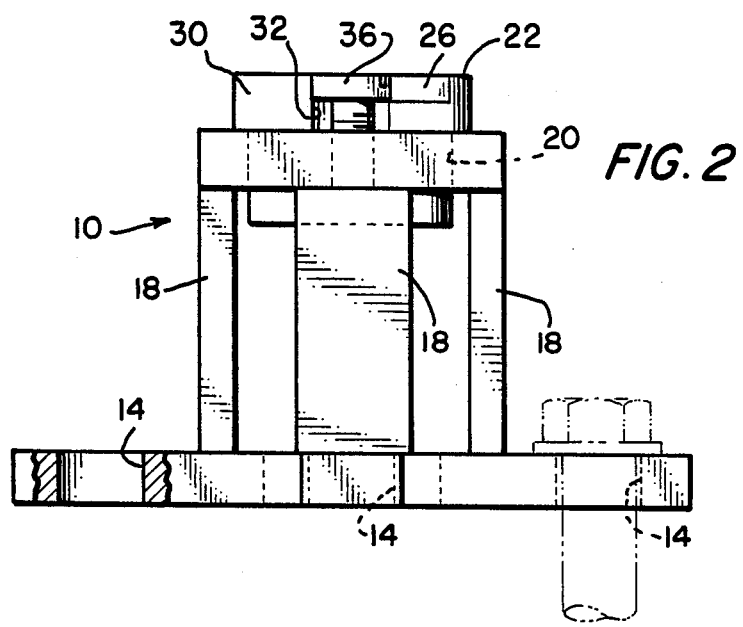
FIG. 2 is a front elevational view of the embodiment of FIG. 1.

As shown in FIGS. 1 and 2, the drill guide fixture 10 in this first embodiment thereof comprises a base 12 having three mounting holes 14 formed therein, and a platform 16 set above the base 12 on three support legs 18. The legs 18 are welded, at the ends thereof, to the base 12 and the platform 16, and fix the base 12 and platform 16 in parallel planes.

The platform 16 has an aperture 20 formed therein in which is slidably received a guide bushing 22. The bushing 22 has a pair of shoulders 24 and 26 formed in a flange 30 thereof, and an arcuate cut-out 32 as well which is contiguous with the one shoulder 26. The platform 16 also has a tapped hole 34 in adjacency to the aperture 20 in which hole is threadedly emplaced a lock screw 36. With the bushing 22 set as shown in the figures, is can be slidably lifted from the platform 16. However, if the bushing 22 is rotated clockwise (as viewed in FIG. 1), the head of the screw 36 will engage the shoulder 26 and can be torqued tight thereagainst to fasten the bushing 22 in place.

The base 12 also has an aperture 38 formed therein which is in direct alignment with the aperture 20 in the platform 16. The fixture 10 is fixed in place, on a tubesheet, by fastening it with plugs set through the mounting holes 14. In U.S. Pat. Nos. 4,385,643 and 4,600,036, patentee Renato R. Noe set forth a "Plug for High-Pressure Testing of Tubes" and "Mechanical Seal Plugs for Fluid-Sealing of Tubes", respectively, in the aforesaid patents which issued on May 31, and July 15, 1986. In that the maintenance and repair of tubes in tubesheets entails the use of such Plugs, it is most likely that the serviceman will have several of the aforesaid, patented plugs with him. Consequently, and with this in mind, the mounting holes are so positioned, and of such diameter, as to accommodate the under-head shanks of the patented plugs. The base 12 is positioned with the aperture 38 aligned with the tube which needs to be drilled, and the base adjusted until the three mounting holes 14 also align with three adjacent tubes. Then, the aforesaid plugs are passed into the mounting holes 14 and into the three aforesaid tubes, and they are fastened in the latter to fix the fixture 10 securely in place. Then a drill can be addressed to the tube requiring the drill-out, via the apertures 20 and 38.

When the tube being worked on has been sufficiently drilled out, the screw 36 is loosened and the bushing 22 is turned to align the screw head with the cut-out 32. Then the bushing 22 can be lifted free of the platform 16 and, if necessary, replaced with a different bushing with a larger aperture to facilitate the reaming of the tubesheet. Note, then, it shall not be necessary, to accomplish any subsequent tubesheet reaming, to disturb the plug-fasteners (one of which is shown, phantomed, in FIG. 2).

Figure 3:
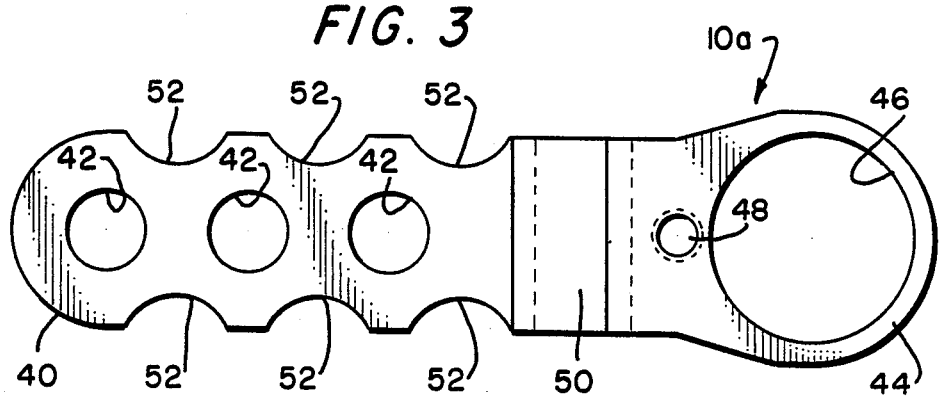
FIG. 3 is a plan view of an alternative embodiment of the novel drill guide fixture.
Figure 4:
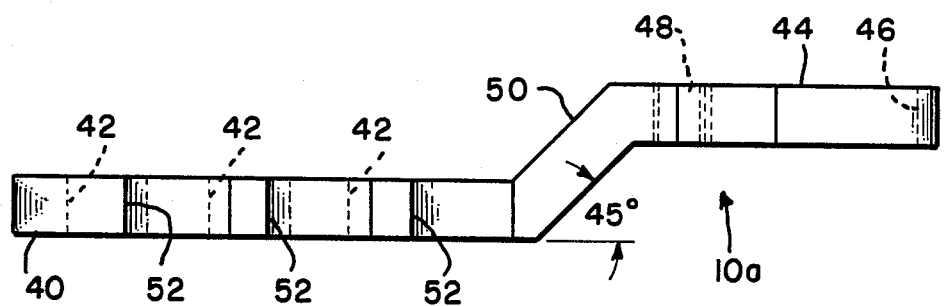
FIG. 4 is a side elevational view of the FIG. 3 embodiment.

Fixture 10 is quite a good tool, in that it offers a wide stance over the tube, or under the tube, which needs to be worked on. However, there are circumstances in which such a broad stance can not be accommodated. That is, the tube which needs to be addressed may be at the edge, for instance, of the tubesheet. For such contingencies, the invention contemplates the alternative embodiment 10a of fixture shown in FIGS. 3 and 4.

The fixture 10a has a base 40 with a plurality of mounting holes 42 in which to receive the aforesaid same plug-fasteners, and a platform 44 with an aperture 46 in which to receive a guide bushing (such as bushing 22 in FIGS. 1 and 2). Fixture 10a, in platform 44 thereof, also has a tapped hole 48 in which to receive a lock screw for securing the bushing in the aperture 46. An angled limb 50, integral with both the base 40 and the platform 44, set at forty-five degrees of arc from the planes of the base 40 and platform 44, maintains the platform in cantilever fashion. Along the sides of the base 40 are pluralities of arcuate reliefs 52; these allow the fixture 10a to be nested between parallel rows of tubes while plug-fasteners are fixed in tubes via the three mounting holes 42.

While I have described my invention in connection with specific embodiments thereof, it is to be clearly understood that this is done only by way of example and not as a limitation to the scope of my invention, as set forth in the objects thereof and in the appended claims.

I claim:

1. A drill guide fixture, for directing drills orthogonally into tubes in tubesheets, comprising:
   first means defining a base;
   second means defining a platform; wherein
   said base and said platform lie in parallel planes;
   said base has a plurality of mounting holes formed therein; and
   said platform has an aperture formed therethrough, parallel with said mounting holes, in which to accommodate a guide bushing for a drill for drilling a given tube in a given tubesheet; wherein
   said mounting holes are so positionally formed as to assure alignment thereof with tubes in said given tubesheet, other than said given tube, to accommodate fasteners for said fixture in said mounting holes and said other tubes.

2. A drill guide fixture, according to claim 1, wherein:
   said platform has a tapped hole therein, in adjacency to said aperture, for threadedly receiving therein a lock screw; and further including
   a guide bushing slidably engaged with said aperture; and
   a lock screw threadedly engaged with said tapped hole.

3. A drill guide fixture, according to claim 2, wherein:
   said guide bushing has a shank and a flange;
   said shank is slidably engaged with said aperture, and said flange forms an interface with said platform.

4. A drill guide fixture, according to claim 3, wherein:
   said flange has a recessed shoulder formed therein;
   said lock screw has a drive head; and
   a portion of said head is engageable with said shoulder.

5. A drill guide fixture, according to claim 3, wherein:
   said flange has a plurality of recessed shoulders formed therein spaced apart locations.

6. A drill guide fixture, according to claim 3, wherein:
   said flange has an arcuate cut-out formed therein.

7. A drill guide fixture, according to claim 5, wherein:
   said flange has an arcuate cut-out formed therein; and
   said cut-out is contiguous with one of said shoulders of said plurality thereof.

8. A drill guide fixture, according to claim 1, wherein:
   said platform is mounted above said base.

9. A drill guide fixture, according to claim 8, further including:
   a plurality of legs, integral with said base and said platform, bridging between said base and platform.

10. A drill guide fixture, according to claim 9, wherein:
    said base has an aperture formed therein directly aligned with, and lying below, said aperture in said platform.

11. A drill guide fixture, according to claim 10, wherein:
    said apertures in said base and said platform are of differing diameters.

12. A drill guide fixture, according to claim 11, wherein:
    said aperture in said base is of considerably smaller diameter than said aperture in said platform.

13. A drill guide fixture, according to claim 1, wherein:
    said base is of an elongate configuration; and
    said platform is joined to said base, at one end of said base, through a limb;
    said platform and said base are integrally joined to said limb; and
    said limb lies at an angle relative to said base and said platform.

14. A drill guide fixture, according to claim 13, wherein:
    said base as a plurality of arcuate reliefs formed in the sides thereof.

15. A drill guide fixture, according to claim 13, wherein:
    said reliefs in each side of said base, and said mounting holes, are of the same number.

* * * * *